United States Patent [19]

Yoshinaka et al.

[11] Patent Number: 5,458,965
[45] Date of Patent: Oct. 17, 1995

[54] POLYESTER LAMINATED FILM

[75] Inventors: Yasuo Yoshinaka; Katsuhiko Nose; Yoshinori Takegawa; Norimi Tabota, all of Ohtsu; Akito Hamano; Katsuaki Kuze, both of Tsuruga, all of Japan

[73] Assignee: Toyo Boseki Kabushiki Kaisha, Japan

[21] Appl. No.: 116,224

[22] Filed: Sep. 2, 1993

Related U.S. Application Data

[63] Continuation of Ser. No. 934,294, Aug. 24, 1992, abandoned, which is a continuation of Ser. No. 466,958, Jan. 18, 1990, abandoned.

[30] Foreign Application Priority Data

| Jan. 19, 1989 | [JP] | Japan | 1-11444 |
| Aug. 24, 1989 | [JP] | Japan | 1-217888 |
| Oct. 2, 1989 | [JP] | Japan | 1-258416 |
| Nov. 29, 1989 | [JP] | Japan | 1-310212 |
| Dec. 4, 1989 | [JP] | Japan | 1-315615 |
| Dec. 5, 1989 | [JP] | Japan | 1-316880 |

[51] Int. Cl.$^6$ ........................................ B32B 5/16
[52] U.S. Cl. .................. 428/323; 428/35.7; 428/480; 428/483
[58] Field of Search .................. 428/34.9, 35.2, 428/35.7, 48, 483, 347, 349, 147, 149, 480, 323, 324, 325, 326, 327, 328, 329, 330, 331

[56] References Cited

U.S. PATENT DOCUMENTS

| 4,585,687 | 4/1986 | Posey et al. | 428/480 |
| 4,606,976 | 8/1986 | Hensel et al. | 428/480 |
| 4,765,999 | 8/1988 | Winter | 426/113 |

FOREIGN PATENT DOCUMENTS

| 0291065 | 11/1988 | European Pat. Off. |
| 3414309 | 10/1985 | Germany. |
| 56-166065 | 12/1981 | Japan. |
| 2222845 | 9/1987 | Japan .................. 428/347 |
| 915779 | 1/1963 | United Kingdom. |
| 1337331 | 11/1973 | United Kingdom. |
| 1428331 | 3/1974 | United Kingdom. |
| 1507876 | 4/1978 | United Kingdom. |
| 8008394 | 3/1980 | United Kingdom. |
| 8008393 | 3/1980 | United Kingdom. |

OTHER PUBLICATIONS

Römpp, Chemie–Lexikon, 9th edition, p. 1587 to extent disclosed by applicants.

*Primary Examiner*—Paul J. Thibodeau
*Assistant Examiner*—R. Follett
*Attorney, Agent, or Firm*—Leydig, Voit & Mayer, Ltd.

[57] ABSTRACT

A polyester laminated film with excellent sealing ability is provided. The polyester laminated film comprises a base film of a polyester resin and a sealing film of a polyester composition, said sealing film being disposed on at least one side of said base film, wherein the sealing energy, which is measured when two pieces of said laminated films are joined together with the respective sealing films facing each other, is 300 g.cm/15 mm or more.

16 Claims, 2 Drawing Sheets

POLYESTER LAMINATED FILM

This is a continuation of application Ser. No. 07/934,294, filed on Aug. 24, 1992, now abandoned, which is a continuation of Ser. No. 07/466,958, filed on Jan. 18, 1990, now abandoned.

BACKGROUND OF THE INVENTION

1. Field of the Invention

This invention relates to a polyester laminated film with sealing ability, and in particular, to a polyester laminated film that has good heat-sealing properties, the sealed portion of which can be peeled off readily by the use of an appropriate amount of force. The film can be used as a film for wrapping and as a film for many industrial uses.

2. Description of the Prior Art

Polyester films (here and below, the word "film" also includes the meaning of "sheet") that have excellent properties such as mechanical strength, heat-resistance, cold-resistance, resistance to chemicals, insulating qualities, stable dimensions, a uniform surface, and transparency are used in a variety of applications such as film for wrapping, tape for electrical insulation, magnetic tape, photographic film, and tracing film. Polyester films are particularly suitable for the wrapping of products, such as for the wrapping of food, because polyester film has no odor, and does not absorb the odors of the food. For such films, films with heat-sealing ability are preferable. However, in general, the melting point of polyester films is high, so it is difficult to perform heat-sealing of the film if polyester film made with a typical polyester, such as polyester terephthalate, is used. Therefor, these polyester resin films are used as the base film, and a sealing layer with a lower melting point is formed on its surface. As resins that can be used for such heat-sealing layers, there are polyolefin resins, vinyl resins, polyester resins, etc. The adhesiveness of polyester resins to a base film made of polyester is particularly satisfactory, so polyester resins are preferable for use in heat-sealing layers.

It is desirable that the sealed portion of such laminated films have the quality of toughness after it has been sealed by the use of heat. Here, the word "toughness" will be used to mean sufficient strength, with permanence, and with the qualities of flexibility and lack of fragility. If the sealed portion does not have toughness, then, for example, if the opening of a bag is heat-sealed to close it, then when the opening of the bag is held in the fingers and pulled to open it, the sealed portion will not peel off properly, but will tear midway, and the bag will tend to be ripped without satisfactory peeling open of the sealed portion, which is a disadvantage.

This kind of laminated film with a heat-sealing layer generally has unsatisfactory slipperiness, and even if a lubricant is added to the base film, it is difficult to wind the film into a roll, and workability is poor. Japanese Laid-Open Patent Publication No. 56-166065 discloses a method by which the slipperiness of a film is improved. In the method, there is addition of an additive consisting of particles the diameter of which is larger than the thickness of the adhesive layer. By the addition of this additive, minute protrusions are formed on the surface of the heat-sealing layer, and this increases the slipperiness of the film, improving workability. However, when a thin film of a metal or metal oxide, such as on aluminum, is deposited on the surface of such laminated films, it is not possible to form a uniform thin film because of the projections on said film surface. Also, the thin film that is formed on top of the particles will be removed when the film obtained is being rolled up or the film comes into contact with a roller surface at the time of manufacture or during secondary processing, resulting in pinholes at the portion that was removed. The gas-barrier properties of the film are worsened by the presence of a number of pinholes, and such a film cannot be used in products that must act as a gas barrier, such as a lid for the sealing of containers to be used for food storage.

SUMMARY OF THE INVENTION

The polyester laminated film of this invention, which overcomes the above-discussed and numerous other disadvantages and deficiencies of the prior art, comprises a base film of a polyester resin and a sealing film of a polyester composition, said sealing film being disposed on at least one side of said base film, wherein the sealing energy, which is measured when two pieces of said laminated films are joined together with the respective sealing films facing each other, is 300 g.cm/15 mm or more.

In a preferred embodiment, the sealing film is a heat-sealing film wherein the starting temperature of thermal molecular motion in said second polyester composition is in the range of 30° to 65° C., and preferably, 45° to 60° C.

In a preferred embodiment, the polyester composition comprises a polyester resin having a starting temperature of thermal molecular motion higher than 50° C. and a polyester resin having a starting temperature of thermal molecular motion lower than or equal to 50° C.

In a preferred embodiment, the ratio of stress under 10% stretch to stress under 50% stretch of at least one of said base films and said sealing film is 1.2 or less.

In a preferred embodiment, the polyester composition comprises a polyester resin containing at least two dicarboxylic acid components as constituent monomers.

In a preferred embodiment, the polyester composition comprises a polyester resin containing at least two diol components as constituent monomers.

In a preferred embodiment, the polyester composition comprises a polyester resin containing at least two dicarboxylic acid components as constituent monomers and a polyester resin containing at least two diol components as constituent monomers.

In a preferred embodiment, the polyester composition comprises:

a polyester resin A containing at least one diol component of the formula:

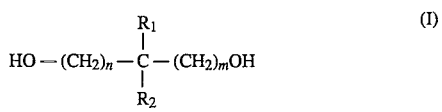

wherein $R_1$ and $R_2$ are independently, hydrogen or alkyl containing 1 to 6 carbon atoms, with the proviso that at least one of $R_1$ and $R_2$ is alkyl containing 1 to 6 carbon atoms, and wherein n and m are, independently, integers of 1 to 6; and a polyester resin B containing at least one dicarboxylic acid component of the formula:

wherein p is an integer of 4 to 20;

$$HO-(CH_2)_q-OH \quad \text{(IIb)}$$

wherein q is an integer of 4 to 10.

In a preferred embodiment, the polyester composition comprises a polyester resin containing at least one lactone component as a constituent monomer.

In a preferred embodiment, the polyester composition comprises at least one of inorganic fine particles and organic fine particles.

In a preferred embodiment, the fine particles have a mean diameter substantially smaller than the thickness of said heat-sealing layer, and said fine particles are present in an amount of 0.01% to 5% by weight based on the total weight of said polyester composition.

In a preferred embodiment, the variation in the diameter of said fine particles observed by scanning electron microscopy is 25% or less, and the ratio of the mean projected cross-sectional area of said fine particles to the mean area of a circumscribed circle of said fine particles observed by scanning electron microscopy is 60% or more.

In a preferred embodiment, the polyester composition comprises a lubricating agent.

In a preferred embodiment, the heat-sealing film is a layered structure composed of at least two kinds of polyester compositions, and the starting temperature of thermal molecular motion in the polyester composition constituting the outermost layer of said heat-sealing film is in the range of 50° to 80° C.

In a preferred embodiment, the base film is composed of a homopolyester or a copolyester.

In a preferred embodiment, the base film is composed of at least two kinds of resins selecting from the group consisting of homopolyesters and copolyesters.

In a preferred embodiment, the polyester laminated film is prepared by the co-extrusion method, in-line laminating method, in-line coating method, or any combination thereof.

In a preferred embodiment, the sealing film is disposed on one side of said base film and a deposited layer or an adhesive layer is disposed on the other side of said base film.

Thus, the invention described herein makes possible the objectives of: (1) providing a polyester laminated film with sealing ability, in particular, a polyester laminated film with heat-sealing ability, that has a tough sealed portion after being sealed, that is, a sealed portion that is strong, and that does not tear itself when the sealed portion of the film is peeled off; (2) providing a polyester film with sealing ability, in particular, a polyester film with a heat-sealing ability, the sealed portion of which, after sealing, can readily be peeled off by the appropriate amount of force in the desired direction; (3) providing a polyester laminated film with sealing ability containing a base film and a sealing film and that has excellent slipperiness; and (4) providing a laminated film with a deposited layer of metal or metal oxide and having above-mentioned excellent properties, with the said deposited layer not being readily rubbed off from the laminated film during the manufacture or secondary processing of the film.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
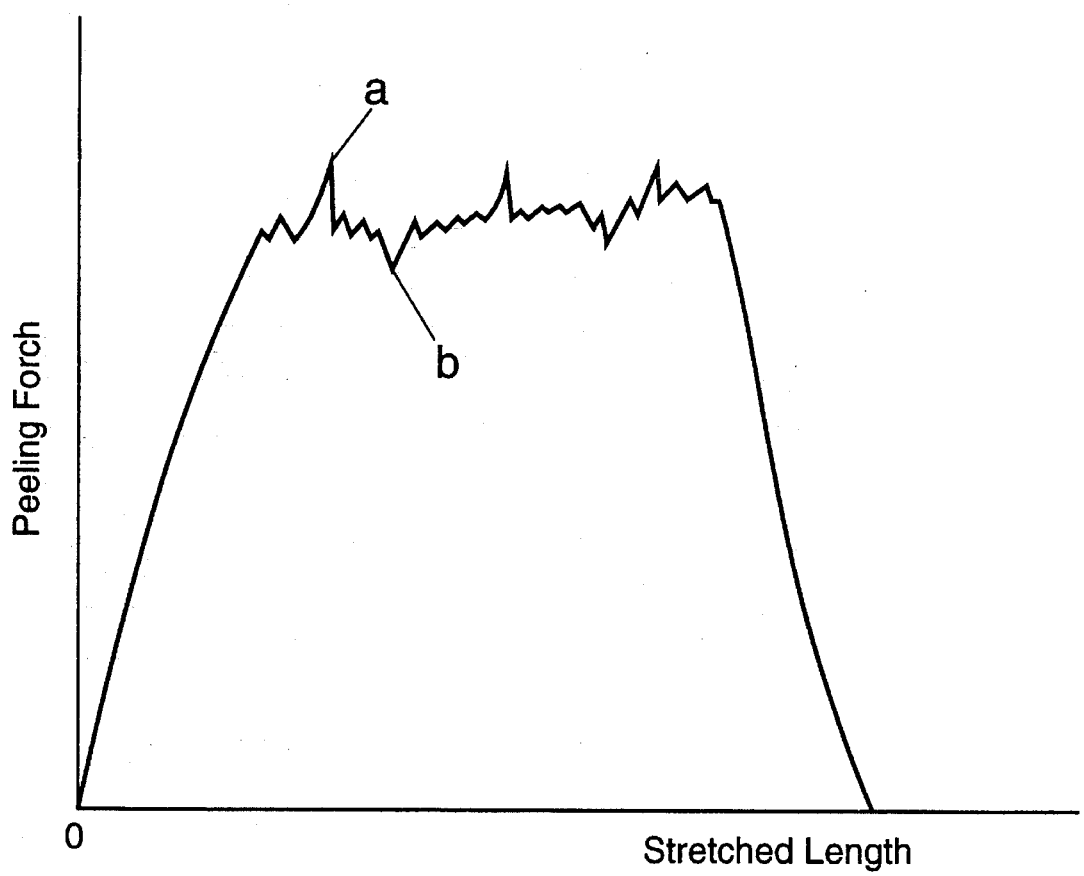
FIG. 1 is a graph showing the relationship between the force used to peel off the sealed portion of the heat-sealing layer when two pieces of laminated films of this invention are heat-sealed together with the respective heat-sealing layers facing each other and the length of the film that has been peeled off.

As the base film for the polyester laminated film of this invention, any kind of polyester film can be used, with no particular limitations. There are, for example, polyethyleneterephthalate, polybutyleneterephthalate, polyethylenenaphthalate, polyethylene-1,2-diphenoxyethane-4,4'-dicarboxylate, and copolymers having, as their main components, monomers that form these resins. It is also possible to use mixtures of such polyesters. Various kind of additives can be added to these polyesters for use as a base film. These additives include, for example, anti-static agents, lubricants, antifogging agents, plasticizers, stabilizers, antiblocking agents, pigments, and the like.

The laminated film of this invention comprises a base film mentioned above and a sealing film layer of a polyester composition disposed at least one side of the base film. This sealing layer has pressure-sensitive adhesiveness property or heat-sealing ability, with the latter property being desirable.

It is preferred that the resin that is the main component of the polyester resin composition used for the heat-sealing layer of the laminated film of this invention has the following qualities:

a) the resin is compatible with the polyester that forms the base;

b) when the laminated film obtained by the use of the resin composition is heat-sealed, the quality of toughness of the heat-sealed portion is maintained, and when the heat-sealed portion is peeled off, pressure is prevented from accumulating in a specific portion, because it has appropriate strength when it is stretched, suitable elasticity ratio, and suitable flexibility; and c) the resin is soluble in solvents generally used for industrial use or the fused resin is easily extruded, so that the manufacture of the laminated film will be easy.

The resin composition that can be used in this invention is a polyester composition that fulfills the above-mentioned conditions.

In the polyester resin composition that is used for the heat-sealing layer of the laminated film of this invention, the starting temperature T of thermal molecular motion is in the range of 30°–65° C. Here, the starting temperature T of thermal molecular motion is the temperature at which the storage modulus changes greatly when measurements of the storage modulus of the composition are being made in relation to temperature dependence by use of a device for the measurement of dynamic viscoelasticity. Particularly desirable as the polyester resin composition is a mixture of a polyester resin with a T higher than 50° C., and preferably with a T of 50°–80° C., and also a polyester resin with a T of 50° C. or less, and preferably of −20° to 50° C.; the T of the entire resin composition after mixing of the resins is in the range of 45° to 60° C. A heat-sealing layer made with this kind of resin composition has excellent heat-sealing ability, and the sealed portion is tough after being heat-sealed. Also, when the laminated film is being rolled, or when the laminated film is being formed into a bag, the sealing layer does not readily stick to the sealing layer or base layer of other laminated film (such sticking is called "blocking").

The film of this invention can be a laminated film of polyester resin that has two or more heat-sealing layers mentioned above. The composition of the outermost heat-sealing layer is preferably made of a polyester with T in the temperature range of 50° to 80° C. The polyester that forms the outermost heat-sealing layer preferably has T lower than that of the inner layer or layers. Such a laminated film is especially excellent in anti-blocking properties.

As the monomer components that can be used in this polyester resin composition, the dicarboxylic acid components and diol components listed below are used.

Examples of the dicarboxylic acid components are aromatic dicarboxylic acids such as terephthalic acid, isophthalic acid, o-phthalic acid, and 2,6-naphthalenedicarboxylic acid; saturated or unsaturated fatty acids containing 2 to 30 carbon atoms such as adipic acid, azelaic acid, sebacic acid, pimelic acid, suberic acid, undecanoic acid, dodecanedioic acid, brassidic acid, tetradecanedioic acid, nonadecanedioic acid, and docosanedioic acid; and alicyclic dicarboxylic acids such as cyclohexanedicarboxylic acid. Examples of the diol components include aliphatic diols such as ethylene glycol, diethylene glycol, butanediol, hexanediol, neopentyl glycol, 2-methyl-2-ethyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-isopropyl-1,3-propanediol, 2-ethyl-2-n-heptyl-1,3-propanediol, 2-ethyl-2-n-hexyl-1,3-propanediol, 2,2-di-n-propyl-1,3-propanediol, 2-n-propyl-2-n-butyl-1,3-propanediol, 2-n-propyl-2-n-heptyl-1,3-propanediol, 2-n-propyl-2-n-hexyl-1,3-propanediol, 2,2-di-n-butyl-1,3-propanediol, 2-n-butyl-2-n-hexyl-1,3-propanediol, 2,2-di-n-heptyl-1,3-propanediol, 2-n-heptyl-2-n-hexyl-1,3-propanediol, and 2,2-di-n-hexyl-1,3-propanediol; alicyclic diols such as 1,4-cyclohexanedimethanol and 1,3-cyclohexanedimethanol; and aromatic diols such as xylylene glycol and ethylene oxide adducts of bisphenol compounds.

It is preferable that at least one of the polyesters included in this composition be an aliphatic-modified polyester. Here, "aliphatic-modified polyester" means a polyester that has at least one kind of specific aliphatic dicarboxylic acid component or specific aliphatic diol component as a component.

In general, the proportion of these aliphatic monomers (i.e., specific dicarboxylic acids and/or diols) constituting the aliphatic-modified polyester and contained in the composition that forms the heat-sealing layer is 5 mol % or more, and preferably 10 mol % or more.

This kind of aliphatic-modified polyester is preferably contained in the composition that forms the heat-sealing layer in the proportion of 10% by weight or more, and preferably in the proportion of 20% by weight or more. However, when the proportion of the aliphatic monomer in the aliphatic-modified polyester is less than 5 mol %, and if the said aliphatic-modified polyester is included in large amounts in the polyester composition, such as when the proportion of aliphatic monomer is 2.5 mol % and the amount of aliphatic-modified polyester is 20% by weight or more in the composition, the same results can be obtained.

The resin composition that is used in the heat-sealing layer preferably comprises a polyester A that has a glycol component of the following formula I, and a polyester B that has as its main ingredient a dicarboxylic acid component of the formula IIa and a glycol component of the formula IIb:

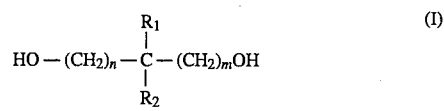

wherein $R_1$ and $R_2$ are independently hydrogen or alkyl with 1 to 6 carbon atoms with the proviso that at least one of $R_1$ and $R_2$ is alkyl with 1 to 6 carbon atoms, and where n and m are independently integers of 1 to 6.

wherein p is an integer of 4 to 20.

wherein q is an integer of 4 to 10.

Examples of the glycol components of Formula I that are contained in the polyester A are 2,2-dimethyl-1,3-propanediol, 2-methyl-2-ethyl-1,3-propanediol, 2-methyl-2-propyl-1,3-propanediol, 2-methyl-2-isopropyl-1,3-propanediol, 2-methyl-2-butyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, 2,2-di-n-hexyl-1,3-propanediol, 2-n-butyl-1,3-propanediol, 2-n-propyl-1,3-propanediol, 2-ethyl-1,4-butanediol, 2-methyl-2-ethyl-1,4-butanediol, 3-methyl-1,5-pentanediol, 3,3-dimethyl-1,5-pentanediol, 3-n-propyl-1,5-pentanediol, and 6-methyl-1,12-dodecanediol. These glycol components are present in an amount of 5% by mole or more, and preferably 10% by mole, based on the total moles of the glycol components.

Preferred is ethylene glycol as the glycol component contained in polyester A, in addition to those in Formula I mentioned above. It is possible to use diethylene glycol, propylene glycol, butanediol, hexanediol, 1,4-cyclohexanedimethanol, etc., provided that they are included in small amounts.

As the dicarboxylic acid component included in polyester A, terephthalic acid is the most preferable. It is acceptable to cause copolymerization with the addition of other dicarboxylic acid components provided that they are included in small amounts.

Examples of other dicarboxylic acid components are aliphatic dicarboxylic acids such as adipic acid, sebacic acid, and azelaic acid; and aromatic dicarboxylic acids such as isophthalic acid, diphenyldicarboxylic acid, and 2,6-naphthalenedicarboxylic acid.

Examples of the dicarboxylic acid components of Formula IIa contained in polyester B are adipic acid, azelaic acid, sebacic acid, pimelic acid, suberic acid, undecanoic acid, dodecanedioic acid, brassidic acid, tetradecanedioic acid, nonadecanedioic acid, and docosanedioic acid. Preferred are adipic acid, azelaic acid, and sebacic acid. These dicarboxylic acid components are present in an amount of 5 to 50% by mole, and preferably 10 to 40% by mole, based on the total moles of the dicarboxylic acid components in polyester B.

Other dicarboxylic acid components in addition to the compounds of Formula IIa mentioned above can be contained in polyester B. Examples of other dicarboxylic acid components are aromatic dicarboxylic acids such as terephthalic acid, isophthalic acid, phthalic acid, and 2,6-naphthalenedicarboxylic acid and alicyclic dicarboxylic acids such as cyclohexanedicarboxylic acid. It is preferable to include at least one of the above-mentioned aromatic dicarboxylic acids. Terephthalic acid is preferred.

Examples of the glycol components of Formula IIb contained in polyester B are butanediol, pentanediol, and hexanediol. These glycol components are present in an amount of 10% by mole or more, preferably 30% by mole or more, and more preferably 50% by mole, based on the total moles of the glycol components in polyester B.

Examples of the glycol components other than the compounds in Formula IIb mentioned above contained in polyester B are ethylene glycol and diethylene glycol. These glycol components can be used together with the above-mentioned. Ethylene glycol is generally used.

The polyester that is included in the heat-sealing layer can be prepared by general methods for the preparation of polyesters. For example, there is the direct esterification method in which polycondensation is achieved by the direct reaction of the dicarboxylic acid and the diol, and there is the transesterification method in which the dimethyl ester of the dicarboxylic acid is reacted with the diol to allow ester exchange. Preparation can be by either the batch or continuous method.

A polyester obtained from lactones can also be used for the resin contained in the polyester composition of the heat-sealing layer. Examples of the lactone are ε-caprolactone, β-propiolactone, butyrolactone, and the combination of two or more of them.

The polyester in the composition prepared in this way preferably has intrinsic viscosity (measured at 25° C. in a 2:3 (v/v) mixture of tetrachloroethane and phenol) (hereinafter referred to as I.V.) of 0.5 or more. If the I.V. is less than 0.5, the laminated film obtained will have slightly inferior characteristics of toughness at the sealed portion after heat-sealing has taken place. The outcome is that when the opening of a bag made of the film that has a heat-sealing layer made of this composition is heat-sealed, the appearance of the sealed portion will be inferior, and when the sealed portion is opened, it will tear before opening properly; or the bag itself will tear without the sealed portion being fully opened.

When the composition contains two kinds of polyesters or more, there is no particular restriction as to the method to be used to mix them together, and the following methods, among others, can be used; (1) each of the two or more polyesters is dissolved separately in an appropriate solvent, and these solutions are mixed, or else the two or more polyesters are mixed in the form of chips (pellets), after which this mixture is dissolved in an appropriate solvent; (2) the two or more polyesters are melted and mixed in an extruder, and strands or sheets extruded by the extruder can be cut to form chips; (3) one of the polyesters is added to a polymerization vessel (in the form, for example, of chips) containing the other polyester in molten form after the synthesis of the other polyester in the said vessel, and mixed, and extruded strands or sheets of the mixed resin can be cut to form chips. To the polyester or mixtures of polyesters, various additives can be added if needed. The additives that may be added include lubricants, antistatic agents, antifogging agents, gas-barrier agents, stabilizers, colorants, plasticizers, anti-blocking agents, agents to confer conductivity, and so on.

The laminated film of this invention is formed by the lamination of a sealing layer made of the above composition on at least one of the sides of the base film mentioned above. For example, the following method can be employed. (1) First, an unstretched base film, single-axis-stretched base film, or double-axis-stretched base film is provided, and on its surface a solution or dispersion containing the above polyester composition is applied. After drying this film, if necessary, the film is subjected to single-axis or double-axis stretching, resulting in the desired laminated film. The solid content of the solution or dispersion that is used in this method is 5–20%, and as the solvents that can be used, there are, for example, chloroform, ethylene dichloride, methyl ethyl ketone, toluene, acetates, or mixtures thereof. Other methods that can also be used include the following. (2) The resin that is to form the base film, e.g., polyethyleneterephthalate (PET), and the resin composition mentioned above are put separately into the barrels of extruders, and both are extruded from the same outlet to give a laminated film. As necessary, this film is subjected to single-axis stretching or double-axis stretching. (3) On an unstretched base film, single-axis stretched base film, or double-axis stretched base film, molten resin composition as extruded, resulting in a laminated film. The laminated film is stretched in one or two dimensions as is needed.

In the manufacture of the laminated film, the base film that is used (unstretched, stretched in one dimension, or stretched in two dimensions) is generally 10 to 200 μm thick, when the film is to be used in wrapping, the thickness of 5–30 μm is preferable. The thickness of the sealing layer (i.e., the above-mentioned resin composition) of the laminated film that is obtained is different depending on the intended use of the film, but it is generally 1 to 50 μm, and preferably 2–15 μm.

When two pieces of the polyester laminated film of this invention obtained in this way are put together so that their heat-sealing layers are in contact, and heat-sealing is done, then, the sealing energy of the sealed portion is 300 g.cm/15 mm or more. The sealing energy is measured as follows:

Measurement of sealing energy: Two laminated films of this invention are put together so that their heat-sealing layers are in contact, and heat-sealing is done of an area measuring 20 mm wide and 10 mm long. The temperature of the heat-sealing is 20° C. higher than the minimum temperature at which heat-sealing of the said sealing layers could be accomplished. This film is cut to give a test strip 15 mm wide, and this test strip is left in the atmosphere at 20° C. and a relative humidity of 65% for 24 hours. Then one end of this test strip is fastened, and the other end is stretched in the long direction of the film at the speed of 200 mm/minute by the use of a tension tester. This causes the entire heat-sealed portion to peel off, or else causes a part of the heat-sealed portion to peel off, and causes the film to tear. The stretched length of the film (the length to which the film had been stretched at the time of peeling off) and the strength needed to cause peeling off (the force exerted on the tension tester) are recorded and plotted on a Graph. The area under the curve is taken to be the sealing energy (g.cm/15 mm).

The film of this invention with a sealing energy of 300 g.m/15 mm or more gives a plateau-shaped curve such as that shown in FIG. 1 when the stretched length at the time of peeling of the laminated film and the peeling force are plotted. The difference between the maximum force exerted on the film (shown as point a in the curve of FIG. 1) and the minimum force exerted on the film (shown as point b in the curve of FIG. 1) is small, and the differences between the mean force exerted on the film and also between the mean force exerted on the film and the minimum force exerted on the film are small. When the adhesive layer is peeled off, after such a film is heat-sealed, the stretched length of the film is equal to or longer than the original length of the sealed portion.

It is preferable, for the laminated film of this invention, that the ratio of stress $F_{10}$ under 10% stretch to stress $F_{50}$ under 50% stretch of at least one of the base films and the sealing film is 1.2 or less. Here, $F_{10}$ and $F_{50}$ which are the stresses at the time of 10% and 50% stretching, are found from a graph drawn by the plotting of the results obtained when one end of the test film is fastened, and the other end is pulled at a uniform speed to stretch it, with the stretching ratio (i.e., the strain) on the x-axis and the stress at the time of stretching on the y-axis. The value for $F_{50}/F_{10}$ is preferably 0.5–1.2, and more preferably in the limits of 0.8–1.2. If the value for $F_{50}/F_{10}$ is more than 1.2, then, after the laminated film has been heat-sealed, and when the sealed portion is to be peeled off, the film will tear in an undesired direction. Preferably, the $F_{50}/F_{10}$ of the base film is 1.2 or less, and more preferably, the $F_{50}/F_{10}$ of the laminated film is 1.2 or less.

As the method for the manufacture of a film with the value for $F_{50}/F_{10}$ in the desired range, the following method, for instance, can be used. After unstretched film has been stretched in the long direction by passage through rollers for use in stretching, stretching is done at right angles to the previous stretching in a heated tenter device. That is, double-axis stretching is performed. As the methods used for stretching, in addition to stretching in one direction and then the other, stretching can also be done in both directions at the same time. In the method of this invention, simultaneous stretching in both directions is preferable. The stretched film is then tensed and slight relaxation treatment takes place in a heated tenter device at a high temperature. The value of $F_{50}/F_{10}$ changes greatly depending on the temperature during stretching, the degree of stretching, and the conditions used for the relaxation treatment. Thus, by the choice of appropriate conditions depending on the resin to be used, it is possible to obtain a film that has the desired value of $F_{50}/F_{10}$.

The laminated film of this invention preferably contains in its heat-sealing layer inorganic and/or organic particles that have a mean diameter that is substantially smaller than the thickness of said heat-sealing layer, so that the slipperiness of the film will be improved, which particles are preferably included at the proportion of 0.01–5% based on the total weight of the heat-sealing layer.

As the material of the inorganic and/or organic particles that are included in the heat-sealing layer, substances that are not soluble in the components that are incorporated in the heat-sealing layer can be chosen. As inorganic substances, there are silicon dioxide, titanium dioxide, zirconium dioxide, etc., which are metallic oxides; kaolinite, zeolite, and other complexes; calcium sulfate, barium sulfate, calcium carbonate, calcium phosphate, and other salts, etc. As organic substances, there are silicon resins that have siloxane bonds in the backbone chain, polystyrene, polyacrylates, and the like. It is possible to use only one kind of particle or to use two kinds or more. The diameter of the inorganic and organic particles is substantially smaller than the thickness of the heat-sealing layer. If the particle diameter is greater than the thickness of the heat-sealing layer, the surface of the heat-sealing layer of the film that is finally obtained will have relatively large projections from it. Therefore, when a vapor-deposited layer is formed on the sealing layer, many pinholes will form on the vapor-deposited layer as described in the section of the prior art. This will prevent the gas-barrier properties from being adequate.

The proportion of the inorganic and/or organic particles to be included in the heat-sealing layer is 0.01–5% by weight, and preferably 0.1–2% by weight. If the proportion is less than 0.01%, the slipperiness of the laminated film is insufficient, and the workability is poor. If more than 5% by weight is included, the transparency of the laminated film is insufficient.

The area ratio of the particles, as calculated by the following equation III, is preferably 60% or more, more preferably 80% or more, and yet more preferably 90% or more.

$$\text{Area ratio (\%)} = \frac{\text{Mean projected cross-sectional area of particles}}{\text{Mean area of circumscribed circle of particles}} \times 100 \quad \text{(III)}$$

In equation III, the projected cross-sectional area of the particles and area of a circumscribed circle of the particles are found by observations by scanning electron microscopy. If the area ratio is less than 60%, the slipperiness of the laminated film obtained is somewhat inferior.

It is preferable that the diameters of the particles be fairly uniform, and that the grain distribution be nearly a monodispersion. In more detail, the variation in the diameter of the particles as found by scanning electron microscopy is preferably 25% or less, and more preferably 20% or less. If the variation in the diameter of the particles is more 25% and many particles with a large diameter are present, then a number of protrusions will be formed on the surface of the laminated film. When the surface of the laminated film is covered with a film that is formed by vapor deposition, pinholes will form; the outcome is that there will sometimes occur a decline in the gas-barrier properties of the laminated film. When the diameter of many of the particles is small, the slipperiness of the laminated film will sometimes be inadequate.

It is possible to use only one kind of the particles mentioned above, or to use two or more kinds. When more than one kind of particle is used together, it is possible to use some particles that have a mean diameter larger than the thickness of the heat-sealing layer, providing that the amount is small.

In the composition that is used to make the heat-sealing layer, it is possible to add various kinds of additives. For example, to prevent clumping of the particles, a surface-active agent or phosphate can be added; or organic phosphate or polymers such as polyacrylate, etc., can be added for the purpose of increasing the compatibility of the particles with the resins contained in the heat-sealing layer. Also, to increase the slipperiness or blocking resistance of the laminated film that is produced, it is possible to add higher fatty acid derivatives as a lubricant.

As such higher fatty acid derivatives, there are calcium ricinolate, magnesium stearate, and other metal soaps; stearil alcohol, cetyl alcohol, and other saturated alcohols; palmitamide, linolamide, and other fatty acid amides; palmitic acid, montanic acid, and other saturated straight-chain fatty acids and their esters; N,N'-diheptadecyladipinamide, N,N'-esters; diheptadecylsebacinamide, and other bisamide compounds; paraffin wax, polyethylene, and other polyolefin waxes; etc.

The resin composition that comprises the polyester resins mentioned above and, as needed, fine particles and various additives can be mixed by an appropriate method. For example, the polyester resin and the particles can be mixed by: (1) the method in which particles are added during the polymerization of said polyester, or (2) the method in which particles are added when the copolymerized polyester is being kneaded in an extruder or the like. So that the particles will be dispersed evenly throughout the heat-sealing layer, it is preferable to use method 1 for the addition of the particles during polymerization. With this method, it is preferable that the addition of the particles be made while the viscosity of the reaction mixture is low, that is, before prepolymers form.

When the particles are to be added, it is preferred that the said particles be dispersed in an appropriate medium. As the medium, it is preferred that one of the liquid substances in the components to be used in preparing the polyester be used. The method used for the dispersion of the particles in the medium can be any of the available methods; ordinary methods for dispersion such as high-speed agitation, high-pressure homogeneous dispersion, and the sandmill method are all appropriate. As method 2 in which the particles are mixed with the resin, the master-batch method is recommended. When additives are to be added, method 2 is employed and the additives are added together with the particles to the resin.

The laminated film of this invention can be used in heat-sealing wrapping. For example, when two pieces of the laminated film are brought into contact with the base layer and heat-sealing layer facing each other, or with the respective sealing layers facing each other, heat-sealing can be done by the application of pressure from above and below with a heated die. The heat-sealing layer of the film has a relatively low melting point, and the heat-sealing can be done readily. The film of this invention has a sealing energy of 300 g.cm/15 mm or more, so the heat-sealed portions are tough. For that reason, when this sealed portion is once again opened, it is possible to peel off the sealed portion by the use of an appropriate amount of force. The force does not accumulate in a particular portion, so that the sealed portion is completely peeled off, not torn midway, and the film does not tear in an undesirable direction in the process of peeling off of the sealed portion. If the base film of the laminated film is stretched in one dimension or in two dimensions, then, the laminated film is particularly preferred for shrink-wrapped packaging and the like that utilizes shrinkage of the film by the application of heat. The laminated film of this invention can be used, in addition to its uses as a heat-sealing film, as, for example, a gas-barrier film after the laminated film is treated by vapor deposition of metals and the like; and for films in printing, copying, dyeing, and the like.

EXAMPLES

This invention will be explained more detail by the following examples. The methods for measurement and evaluation used were as follows.

1) Measurement of heat-sealing energy: Two of the laminated films obtained were put together so that their heat-sealing layers were in contact, and heat-sealing was done of an area 20 mm wide and 10 mm long. The temperature used in the heat-sealing was 20° C. higher than the minimum temperature at which heat-sealing of the said heat-sealing layers could be accomplished (i.e., 20° C. higher than the softening point of the heat-sealing layer). The film was cut into a test strip 15 mm wide, and left for 24 hours in the atmosphere at 20° C. and a relative humidity of 65%. Then one end of this test strip was fastened, and the other end was pulled so as to stretch the film in the long direction with a tension tester at the rate of 200 mm/minute. This caused the entire heat-sealed portion to peel off, or else caused a part of the heat-sealed portion to peel off, and caused the film to tear. The relationship between the degree of stretching of the film on peeling (i.e., the length of stretching when peeling occurs) and the peeling force (i.e., the force exerting on the tension tester) was plotted, and the area under the curve was taken as the sealing energy (g.cm/15 mm).

2) Measurement of heat-sealing strength: The measurements of the sealing energy made as described above were used and the mean value exerted on the tension tester was taken to be the mean heat-sealing strength (g/15 mm). In addition, the maximum force exerted on the tension tester was taken as the maximum heat-sealing strength.

3) Peeling test: A heat-sealed test strip obtained in section 1 was used. Both ends of the test strip were held in the fingers and pulled to peel off the heat-sealing portion. This peeling test was done ten times.

⊚: All of the test samples peeled off without tearing in all of the experiments.

○: One or two of the 10 test samples tore.

×: Three or more of the 10 test samples tore.

4) Measurement of starting temperature of thermal molecular motion: A sample strip of the laminated film to be tested was stretched without providing slack, and one end of the sample strip was vibrated as the temperature of the measurement system was increased. The frequency of the vibration was 110 Hz. Then, the storage modulus of the resin composition constituting the sealing layer was calculated by the use of an apparatus for the measurement of dynamic viscoelasticity (D.V.E. Rheospectoler; Rheorogy Co., Ltd. ). The relationship between the temperature and the storage modulus was plotted, and the point at which the storage modulus became $1 \times 10$ dyn/cm$^2$ was defined as the starting temperature T of thermal molecular motion of the resin composition.

5) Evaluation of anti-blocking properties: Two of the laminated films obtained were brought into contact with each other so that the heat-sealing layers were brought into contact each other, and the two films were pressed together at the pressure of 0.07 kg/cm$^2$ in the air at 50° C. and the relative humidity of 50% for 24 hours. The condition of the two films after being pressed together was evaluated.

⊚: No area of the films adhered to each other.

Δ: portion of the films adhered.

×: Adhesion over a wide area.

Figure 2:
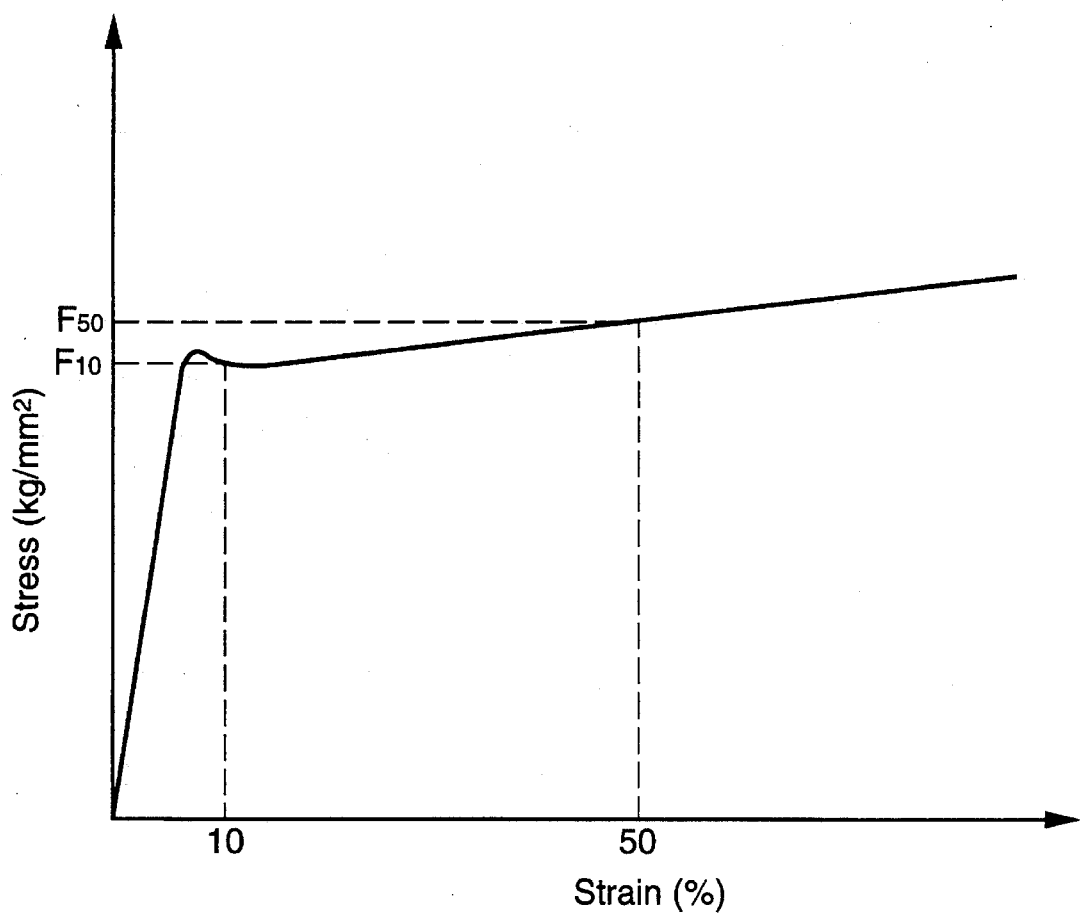
FIG. 2 is a graph that shows one example of the relationship between the pressure that exerted on the test film and the strain of the film.

6) Measurement of $F_{50}/F_{10}$: The film was pulled in the long direction by the method of JIS C2318 at the rate of 200 mm/minute, and the curve of the force versus the stretching ratio in FIG. 2 was plotted, from which $F_{50}$ and $F_{10}$ were obtained.

7) Measurement of mean particle diameter and variation in diameter of fine particles: Photographs were taken of the particles used with a scanning electron microscope (Hitachi S-510), and the photographs were enlarged. Then 200 particles selected randomly were traced and these images were blacked out. The images were measured for Feret's diameter in the horizontal direction by the use of an image analyzing device (Luzex 500, NIRECO Co. ), and the mean of these values was used as the mean particle diameter. The variation in diameter of particles was calculated from the following equation:

$$\text{Variation in diameter (\%)} = \frac{\text{Standard deviation of particle diameter}}{\text{Mean particle diameter}} \times 100$$

8) Measurement of area ratio: From the traced images of particles used for the measurement of the mean particle diameter, 20 traced images were chosen at random, and their projected cross-sectional area was measured with the image analyzing device used in Section 7. The area of the circumscribed circle of each particle was calculated, and the area ratio (%) was found by use of the following equation.

$$\text{Area ratio (\%)} = \frac{\text{Mean projected cross-sectional area of particles}}{\text{Mean area of circumscribed circle of particles}} \times 100$$

9) Evaluation of film transparency: The haze value of the film was measured according to JIS K6714 by use of a haze meter (Toyo Seiki Co., Ltd.).

10) Evaluation of slipperiness of laminated film: ASTM-D-1894-63T was followed, and under the conditions of a temperature of 23° C., a relative humidity of 65%, and a rate of pulling of 200 mm/min, the coefficient of kinetic friction of two heat-sealing layers of the laminated film placed together and of the surface of a heat-sealing layer placed together with the surface of the base film was measured.

11) Measurement of the gas permeation rate through film with a deposit: Continuous vacuum deposition was used for the vapor deposition of aluminium 500Å thick on the surface of the base film of the laminated film. The rate at which oxygen passed through this deposited film was measured under dry conditions at 25° C. according to ASTM-D-1434-75.

Example 1

As the composition for the heat-sealing layer, polyester I or else a mixture of polyester I and polyester II in Table 1 was used. (In Table 1, the amounts of compounds for preparing polyester I or II are given as mol %, and the proportions used in the blends of polyester I and polyester II are proportions by weight.) To the barrels of two extruders, a single T-shaped die was connected, and polyester I or a mixture of polyester I and polyester II was put into one of the barrels; into the barrel of the other, polyethyleneterephthalate (PET; I.V.=0.62) was placed. The resin in the barrels was melted at the temperature of 280° C., and a laminated sheet was extruded from the T-shaped die. This laminated sheet was cooled and hardened by being wrapped around a rotating roller for cooling (at 20° C). The thickness of the laminated sheet was about 160 μm, the thickness of the PET layer (the base sheet layer) was 110 μm, and the thickness of the heat-sealing layer (the layer that contained polyester I, or else polyester I and polyester II) was 50 μm. This sheet was heated at 85° C. and stretched 3.4-fold in the direction of movement through two sets of nipping rollers that rotated at different speeds. The film obtained that was stretched in one direction was supplied to a tenter device for stretching in the direction of the width of the sheet, and the film was stretched 3.6-fold in the direction at right angles to the direction of the above stretching at 95° C. Then, the film was released somewhat from being stretched and treated by a hot blast of air at 210° C. before being rolled.

The sealing strength and sealing energy of the laminated film that was obtained were evaluated and the pealing test of the film was carried out by the methods described above. The results are shown in Table 1. The results for the laminated films obtained in Examples 2–8 and for Comparative Examples 1–5 are also shown in Table 1.

Examples 2–8

A laminated film was prepared in the same manner as in Example 1 except that the components of polyesters as shown in Table 1 were used to form a heat-sealing layer of the laminated film.

Comparative Examples 1 and 2

A laminated film was prepared in the same manner as in Example 1 except that polyester I containing an specific aliphatic monomer, as shown in Table 1, in an amount of less than 5 mol %, was used to form a heat-sealing layer of the laminated film.

Comparative Examples 3 and 4

A laminated film was prepared in the same manner as in Example 1 except that polyesters in which all of the dicarboxylic acid components were aromatic compounds, as shown in Table 1, were used to form a heat-sealing layer of the laminated film.

Comparative Example 5

A laminated film was prepared in the same manner as in Example 1 except that polyester I was used in an amount of less than 10 mol %, as shown in Table 1, to form a heat-sealing layer of the laminated film.

TABLE 1

| | Components of polyester I | | | | | | | | | | Components of polyester II | | | Proportion of blend (polyester I/ polyester II) | Temperature for heat-sealing (°C.) |
|---|---|---|---|---|---|---|---|---|---|---|---|---|---|---|---|
| | TPA | IPA | OPA | SA | AA | EG | NPG | DEP | BD | HD | TPA | EG | NPG | | |
| Example | | | | | | | | | | | | | | | |
| 1 | 90 | | | 10 | | 100 | | | | | | | | 100/0 | 130 |
| 2 | 100 | | | | | 80 | 20 | | | | | | | 100/0 | 130 |
| 3 | 90 | | | | 10 | 90 | | 10 | | | | | | 100/0 | 110 |
| 4 | 100 | | | | | 70 | | | 30 | | | | | 100/0 | 120 |
| 5 | 80 | 10 | | 10 | | 100 | | | | | | | | 100/0 | 100 |
| 6 | 80 | | 10 | 10 | | 100 | | | | | | | | 100/0 | 100 |
| 7 | 90 | | 5 | | 5 | 100 | | | | | 100 | 60 | 40 | 70/30 | 100 |
| 8 | 100 | | | | | 70 | 10 | | 20 | | | | | 100/0 | 110 |
| Comparative Examples | | | | | | | | | | | | | | | |
| 1 | 96 | | | 4 | | 100 | | | | | | | | 100/0 | 190 |
| 2 | 100 | | | | | 97 | 3 | | | | | | | 100/0 | 210 |

TABLE 1-continued

| 3 | 80 | 10 | 10 |   | 100 |   |   |   |   | 100/0 | 130 |
| 4 | 90 |    | 10 |   | 100 |   |   | 100 | 100 | 90/10 | 200 |
| 5 | 90 |    |    | 10 | 100 |   |   | 100 | 100 | 8/92 | 200 |

|  | Evaluation of heat-sealing | | | |
| --- | --- | --- | --- | --- |
|  | Heat-sealing strength (g/15 mm) | | Sealing energy | Peeling |
|  | Mean value | Maximum value | (g · cm/15 mm) | test |
| Examples | | | | |
| 1 | 520 | 630 | 450 | ○ |
| 2 | 480 | 590 | 400 | ○ |
| 3 | 620 | 640 | 610 | ⊚ |
| 4 | 510 | 610 | 550 | ⊚ |
| 5 | 670 | 780 | 690 | ⊚ |
| 6 | 710 | 790 | 730 | ⊚ |
| 7 | 780 | 860 | 810 | ⊚ |
| 8 | 490 | 660 | 480 | ○ |
| Comparative Examples | | | | |
| 1 | 350 | 620 | 280 | X |
| 2 | 360 | 720 | 250 | X |
| 3 | 450 | 650 | 250 | X |
| 4 | 410 | 420 | 290 | X |
| 5 | 320 | 380 | 220 | X |

Components of polyesters are abbreviated as follows: TPA, terephthalic acid; IPA, isophthalic acid; OPA, o-phthalic acid; SA, sebacic acid; AA, adipic acid; EG, ethylene glycol; NPG, neopentyl glycol; DEP, 2,2-deithyl-1,3-propanediol; BD, butanediol; and HD, hexanediol.

Table 2.

Example 9

As the composition for the heat-sealing layer, a mixture of polyester III and polyester IV shown in Table 2 was used. (In Table 2, the amounts of compounds for preparing the polyester III or IV are given as mol %, and the proportions used in the blends of polyesters III and IV are proportions by weight). To the barrels of two extruders, a single T-shaped die was connected, and polyester III and polyester IV were placed into one of the barrels; into the barrel of the other, polyethyleneterephthalate (PET; I.V.=0.62) was placed. The resin in the barrels was melted at the temperature of 280° C., and a laminated sheet was extruded from the T-shaped die. This laminated sheet was cooled and hardened by being wrapped around a rotating roller for cooling (at 20° C.). The thickness of the laminated sheet was about 200 μm, the thickness of the PET layer (the base sheet layer) was 150 μm, and the thickness of the heat-sealing layer (the layer that contained polyester III and polyester IV was 50 μm. This sheet was heated at 90° C. and stretched 3.3-fold in the direction of movement through two sets of nipping rollers that rotated at different speeds. The film obtained that was stretched in one direction was supplied to a tenter device for stretching in the direction of the width of the sheet, and the film was stretched 3.3-fold in the direction at right angles to the direction of the above stretching at 100° C. Then, the film was released somewhat from being stretched and was treated by a hot blast of air at 220° C. before being rolled.

The sealing energy and antiblocking property of the laminated film that was obtained were evaluated by the methods described above. The results are shown in Table 2. The results for the laminated films obtained in Examples 10–13 and in Comparative Examples 6–11 are also shown in

Examples 10 and 11

A laminated film was obtained in the same manner as in Example 9 except for changes in the proportions of the blend of polyesters III and IV as shown in Table 2.

Example 12

A laminated film was obtained in the same manner as in Example 9 except that the polyester III shown in Table 2 was used to form a heat-sealing layer of the laminated film.

Example 13

A laminated film was obtained in the same manner as in Example 9 except that the polyester IV shown in Table 2 was used to form a heat-sealing layer of the laminated film.

Comparative Example 6

A laminated film was obtained in the same manner as in Example 9 except that only polyester III shown in Table 2 was used to form a heat-sealing layer of the laminated film.

Comparative Example 7

A laminated film was obtained in the same manner as in Example 9 except that only polyester IV shown in Table 2 was used to form a heat-sealing layer of the laminated film.

Comparative Example 8

A laminated film was obtained in the same manner as in Example 9 except for changes in the proportions of the blend of polyester III and polyester IV. The starting temperature T of thermal molecular motion of the polyester blend was higher than 60° C., in which respect this laminated film was different from the films of Examples 9–11.

Comparative Example 9

A laminated film was obtained in the same manner as in Example 9 except for changes in the proportions of the blend of polyester III and polyester IV. The starting temperature T of thermal molecular motion of the polyester blend was less than 45° C., in which respect this laminated film was different from the films of Examples 9–11.

Comparative Example 10

A laminated film was obtained in the same manner as in Example 10 except that polyester III with the starting temperature T of thermal molecular motion of more than 80° C. was used to form the heat-sealing layer.

Comparative Example 11

A laminated film was obtained in the same manner as in Example 10 except that polyester IV with the starting temperature T of thermal molecular motion of less than −20° C. was used to form the heat-sealing layer.

TABLE 2

| | Composition of heat-sealing layer | | | | | | | | | | | Proportion of blend (wt %) | |
|---|---|---|---|---|---|---|---|---|---|---|---|---|---|
| | Polyester III (mol %) | | | | | | Polyester IV (mol %) | | | | | | |
| | TPA | IPA | BD | EG | DEG | NPG | TPA | IPA | SA | AA | EG | DEG | (III) | (IV) |
| Examples | | | | | | | | | | | | | | |
| 9 | 100 | | | 70 | | 30 | 62 | 32 | | 6 | 72 | 28 | 50 | 50 |
| 10 | 100 | | | 70 | | 30 | 62 | 32 | | 6 | 72 | 28 | 80 | 20 |
| 11 | 100 | | | 70 | | 30 | 62 | 32 | | 6 | 72 | 28 | 30 | 70 |
| 12 | 90 | 10 | | 100 | | | 62 | 32 | | 6 | 72 | 28 | 50 | 50 |
| 13 | 100 | | | 70 | | 30 | 61 | 39 | | | 68 | 32 | 50 | 50 |
| Comparative Examples | | | | | | | | | | | | | | |
| 6 | 100 | | | 70 | | 30 | | | | | | | 100 | 0 |
| 7 | | | | | | | 62 | 32 | | 6 | 72 | 28 | 0 | 100 |
| 8 | 100 | | | 70 | | 30 | 62 | 32 | | 6 | 72 | 28 | 95 | 5 |
| 9 | 100 | | | 70 | | 30 | 62 | 32 | | 6 | 72 | 28 | 20 | 80 |
| 10 | 70 | 30 | 100 | | | | 62 | 32 | | 6 | 72 | 28 | 80 | 20 |
| 11 | 100 | | | 70 | | 30 | 53 | 47 | | | 100 | | 80 | 20 |

| | Starting temperature of thermal molecular motion (T) (°C.) | | | Sealing energy (g · cm/15 mm) | Antiblocking property |
|---|---|---|---|---|---|
| | (III) | (IV) | Mixture of polyester III and IV | | |
| Examples | | | | | |
| 9 | 65 | 32 | 52 | 760 | ⊚ |
| 10 | 65 | 32 | 60 | 800 | ⊚ |
| 11 | 65 | 32 | 45 | 900 | ⊚ |
| 12 | 64 | 32 | 51 | 780 | ⊚ |
| 13 | 65 | 50 | 58 | 740 | ⊚ |
| Comparative Examples | | | | | |
| 6 | 65 | | 65 | 250 | ⊙ |
| 7 | | 32 | 32 | 655 | X |
| 8 | 65 | 32 | 65 | 270 | ⊙ |
| 9 | 65 | 32 | 44 | 750 | X |
| 10 | 160 | 32 | 145 | 100 | ⊙ |
| 11 | 65 | −28 | 46 | 850 | X |

Temperature for heat-sealing: a temperature at which heat-sealing can be accomplished plus 20° C.
Components of polyesters are abbreviated as follows: TPA, terephthalic acid; IPA, isophthalic acid; SA, sebacic acid; AA, adipic acid; BD, butanediol; EG, ethylene glycol; DEG, diethylene glycol; and NPG, neopentyl glycol.

Example 14

Chips of polyester V and polyester VI, shown in Table 3, were prepared. (In Table 3, the amounts of compounds for preparing polyester V or VI are given as mol %, and the proportions used in the blends of polyesters V and VI are proportions by weight.)

To the barrels of two extruders, a single T-shaped die was connected, and polyester V and polyester VI were placed into one of the barrels at the proportions shown in Table 3. Into the barrel of the other, polyethyleneterephthalate (PET, I.V.=0.62) that had been thoroughly dried in vacuo was placed. The polyester V and polyester VI in the barrel was melted at the temperature of 280° C., and the barrel containing the PET was heated to 285° C. to melt the resin, after which a laminated sheet was extruded from the T-shaped die. This laminated sheet was cooled and hardened by being wrapped around a rotating roller for cooling (at 20° C.). This sheet was heated at 85° C. and stretched 3.4-fold in the direction of movement through two sets of nipping rollers that rotated at different speeds. The film obtained that was stretched in one direction was supplied to a tenter device for stretching in the direction of the width of the sheet, and the film was stretched 3.2-fold in the direction at right angles to the direction of the above stretching at 95° C. The film was then relaxed somewhat from being stretched and was treated with a hot blast of air at 220° C. before being rolled. In the laminated film that was obtained, the thickness of the base film layer (the PET layer) was 13 μm, and the thickness of the heat-sealing layer (the layer containing polyester V and polyester VI) was 2 μm.

The $F_{50}/F_{10}$ value of the laminated film obtained was calculated, and a peeling test of the film was carried out, results are shown in Table 3. The results for the laminated films obtained in Examples 14–20 and in Comparative Examples 12 and 13 are also shown in Table 3.

Examples 15–18

A laminated film was obtained in the same manner as in Example 14 except for the conditions used in the stretching of the sheet or the composition of polyesters V and VI, which were as shown in Table 3.

Example 19

A laminated film was obtained in the same manner as in Example 14, except that a film of polyethyleneterephthalate copolymer containing 5 mol % of isophthalic acid was used as the base film instead of polyethyleneterephthalate film, and that the conditions used in the stretching were changed as shown in Table 3.

Example 20

PET that had been thoroughly dried was placed into the barrel of an extruder, and a sheet was extruded from the die of the extruder. This film was stretched in both dimensions, the conditions of which stretchings are shown in Table 3, resulting in a base film. Adhesive was applied to one side of this base film, and unstretched polyethylene film 15 μm thick was laminated to the base film as the heat-sealing layer, resulting in a laminated film. The laminated film obtained was evaluated as in Example 14, and the results are shown in Table 3.

Comparative Examples 12 and 13

A laminated film was obtained in the same manner as in Example 14 except for changes in the composition of polyester V and VI and/or changes in the conditions used for stretching of the sheet.

TABLE 3

| | Composition of heat-sealing layer | | | | | | | | | | | | | |
|---|---|---|---|---|---|---|---|---|---|---|---|---|---|---|
| | Polyester V | | | | | | | | Polyester VI | | | Proportion of blend (wt %) | | Base |
| | TPA | IPA | AA | SA | EG | BD | PEG | HD | TPA | EG | NPG | V | VI | film |
| Examples | | | | | | | | | | | | | | |
| 14 | 70 | 5 | 25 | — | 70 | — | — | 100 | 70 | 30 | 20 | 80 | PET | |
| 15 | 70 | 5 | 25 | — | 30 | 70 | — | — | 100 | 70 | 30 | 20 | 80 | PET |
| 16 | 60 | 40 | — | — | 70 | — | 30 | — | — | — | — | 100 | 0 | PET |
| 17 | 53 | — | — | 47 | 100 | — | — | — | 100 | 70 | 30 | 50 | 50 | PET |
| 18 | 70 | 30 | — | — | 100 | — | — | — | — | — | — | 100 | 0 | PET |
| 19 | 70 | 5 | — | 25 | 30 | — | — | 70 | 100 | 70 | 30 | 30 | 70 | PET |
| 20 | 70 | 5 | 25 | — | 30 | 70 | — | — | 100 | 70 | 30 | 20 | 80 | IPAC |
| Comparative Examples | | | | | | | | | | | | | | |
| 12 | 70 | 5 | 25 | — | 30 | 70 | — | — | 100 | 70 | 30 | 20 | 80 | PET |
| 13 | 60 | 40 | — | — | 70 | — | 30 | — | — | — | — | 100 | 0 | PET |

| | Stretching conditions for laminated film | | | | | |
|---|---|---|---|---|---|---|
| | Long direction | | Direction at right angles to long direction | | | |
| | Stretching ratio | Temperature (°C.) | Stretching ratio | Temperature (°C.) | $F_{50}/F_{10}$ | Peeling test |
| Examples | | | | | | |
| 14 | 3.2 | 85 | 3.2 | 95 | 1.07 | ⊚ |
| 15 | 3.5 | 90 | 3.2 | 90 | 1.10 | ⊚ |
| 16 | 3.2 | 85 | 3.2 | 95 | 1.08 | ⊚ |
| 17 | 3.2 | 85 | 3.2 | 95 | 1.06 | ⊚ |
| 18 | 3.2 | 85 | 3.2 | 95 | 1.09 | ○ |
| 19 | 3.2 | 85 | 3.2 | 95 | 1.06 | ⊚ |
| 20 | 3.6 | 85 | 3.6 | 95 | 1.05 | ⊚ |
| Comparative Examples | | | | | | |
| 12 | 4.2 | 90 | 4.2 | 95 | 1.35 | X |

TABLE 3-continued

| | | | | | | |
|---|---|---|---|---|---|---|
| 13 | 4.2 | 90 | 4.2 | 95 | 1.38 | X |

Temperature for heat-sealing: 100° C.
Components of polyesters are abbreviated as follows: TPA, terephthalic acid; IPA, isophthalic acid; AA, adipic acid; SA, sebacic acid; EG, ethylene glycol; BD, butanediol; PEG, polyethylene glycol; and HD, hexanediol.
IPAC: Copolymer containing isophthalic acid

Example 21

1) Preparation of copolyester VII: In a stainless-steel autoclave provided with a stirrer, distilling column, and pressure regulator, 519 parts by weight of terephthalic acid, 375 parts by weight of ethylene glycol, 50 parts by weight of neopentyl glycol, 0.150 parts by weight of antimony trioxide, 0.0428 parts by weight of sodium acetate, 0.26 parts by weight of zinc acetate dihydrate, and 15 parts by weight of ethylene glycol slurry containing 20% by weight of the silica particles shown in Table 4 (mean particle diameter, 2.0 μm; variation in diameter of particles, 15%; area ratio, 94%) were placed. The air in the autoclave was replaced with nitrogen, and the autoclave pressurized to give a gauge pressure of 2.5 kg/cm$^2$; the water that was formed at 240° C. was removed continuously by the distilling column, and an esterification reaction was allowed to proceed for 120 minutes. Then the pressure was allowed to reduce to atmospheric pressure, obtaining a product with a degree of esterification of 98%. The reaction mixture containing this product was transferred to a heated vessel (240° C.) for polycondensation reactions. The mixture was heated so as to reach 275° C. and the pressure was gradually reduced to 0.05 mm Hg; polymerization was allowed to proceed under these conditions for 70 minutes. In this way, polyester with the I.V. of 0.681 (called copolyester VII) was obtained. The amount of silica particles in copolyester VII was 0.5% by weight.

2) Preparation of laminated film: A single T-shaped die was connected to the barrels of two extruders, and in one barrel, the copolyester VII prepared in section 1, copolyester VIII (which contained terephthalic acid, sebacic acid, and ethylene glycol at the weight ratio of 60:40:100), and copolyester IX (which contained terephthalic acid, isophthalic acid, adipic acid, ethylene glycol, and butanediol at the weight ratio of 70:10:20:35:65) were placed. The proportions of polyester VII, polyester VIII and polyester IX were 50:45:5 by weight. In the other barrel, polyethyleneterephthalate (PET; I.V.=0.62) that contained 0.04% by weight of silica (the same kind of silica that was added to copolyester VII) was placed. The resin in the barrels was melted at 280° C., and a laminated sheet was extruded from the T-shaped die. This laminated sheet was cooled and hardened by being wrapped on a rotating roller for cooling (at 20° C.). The thickness of this sheet was about 141 μm, and the thickness of the PET layer (the base layer) was 110 μm; the thickness of the heat-sealing layer (the layer that contained polyesters VII, VIII, and IX) was 31 μm. This sheet was stretched 3.4-fold in the direction of its movement through two pairs of nipping rollers heated at 85° C. and moving at different speeds. The film obtained that was stretched in one direction was supplied to a tenter device for stretching in the direction of the width of the sheet, and the film was stretched 3.6-fold in the direction at right angles to the direction of the above stretching, at 95° C. Then, the film was released somewhat from being stretched and was treated by a hot blast of air at 210° C. before being rolled.

The material of the particles used in the heat-sealing layer of this laminated film, the particle size and properties, and the thickness of the heat-sealing layer are shown in Table 4. The same items for the laminated films obtained in Examples 22 and 23 and Comparative Examples 14-18 are also shown in Table 4.

Example 22

A laminated film was obtained in the same manner as in Example 21 except for changes in the material of the particles used in the heat-sealing layer, their size, their properties, and the amount used, which are all shown in Table 4.

Example 23

A laminated film was obtained in the same manner as in Example 21 except for changes in the particle size, properties, and the amount used in the heat-sealing layer, and for the thickness of the heat-sealing layer, all of which are shown in Table 4.

Comparative Examples 14–18

A laminated film was obtained in the same manner as in Example 21 except for the changes in the material of the particles, their size, their properties, and the amount used in the heat-sealing layer, and except for the thickness of the heat-sealing layer, all of which are shown in Table 4.

TABLE 4

| | | Fine particles in heat-sealing layer | | | | Thickness of heat-sealing layer (μm) |
|---|---|---|---|---|---|---|
| | Material | Mean particle diameter (μm) | Variation in diameter of particles (%) | Area ratio (%) | Content (%) | |
| Examples | | | | | | |
| 21 | Silica | 2.0 | 15 | 94 | 0.5 | 2.5 |
| 22 | Silicone resin | 2.0 | 14 | 96 | 0.3 | 2.5 |
| 23 | Silica | 3.5 | 18 | 90 | 0.6 | 4.0 |
| Comparative | | | | | | |

TABLE 4-continued

| Examples | | | | | | |
|---|---|---|---|---|---|---|
| 14 | Silica | 3.5 | 100 | 94 | 0.5 | 2.5 |
| 15 | Silica | 3.5 | 18 | 90 | 0.5 | 2.5 |
| 16 | Silica | 2.0 | 15 | 94 | 0.005 | 2.5 |
| 17 | Silica | 2.0 | 15 | 94 | 5.5 | 2.5 |
| 18 | Silicone resin | 4.5 | 40 | 55 | 0.6 | 4.0 |

| | Properties of laminated film | | | | | |
|---|---|---|---|---|---|---|
| | | Friction coefficient (μd) | | Heat-sealing layer | | |
| | Haze (%) | Surface of heat-sealing layer/ surface of heat-sealing layer | Surface of heat-sealing layer/ surface of base layer | Temperature for heat-sealing (°C.) | Heat-sealing energy (g · cm/15 mm) | Heat-sealing strength (g/15 mm) | O$_2$ permeation rate (cc/m$^2$ · 24 hr atm) |
| Examples | | | | | | | |
| 21 | 1.5 | 0.65 | 0.45 | 100 | 600 | 400 | 0.9 |
| 22 | 1.2 | 0.67 | 0.45 | 100 | 590 | 400 | 0.9 |
| 23 | 2.0 | 0.64 | 0.46 | 100 | 1100 | 750 | 0.9 |
| Comparative Examples | | | | | | | |
| 14 | 2.0 | 0.63 | 0.44 | 100 | 600 | 390 | 3.0 |
| 15 | 2.5 | 0.60 | 0.42 | 100 | 580 | 380 | 2.5 |
| 16 | 1.0 | >1.0 | >1.0 | 100 | 590 | 410 | 0.9 |
| 17 | 4.2 | 0.50 | 0.35 | 100 | 500 | 350 | — |
| 18 | 2.5 | 0.59 | 0.40 | 100 | 1100 | 780 | 2.3 |

Example 24

A laminated film was obtained by the use of two polyester compositions layered together for the heat-sealing layer. Three extruders were connected to a single three-layered die. In the barrel of the first extruder, the material for the preparation of the base film, polyethylenenaphthalate (I.V.= 0.62) was placed. In the barrel of the second extruder, the material for the first heat-sealing layer, copolyester X (which contained terephthalic acid, isophthalic acid, sebacic acid, ethylene glycol, and neopentyl glycol at the molar ratio of 45:30:25:50:50; the starting temperature T of thermal molecular motion was 20° C.) and copolyester XI (which contained terephthalic acid, ethylene glycol, and 2,2-diethyl-1,3-propanediol at the molar ratio of 100:70:30; T was 62° C.) were placed together. T of the mixture of copolyester X and XI was 31° C. In the barrel of the third extruder, the material for the second heat-sealing layer, copolyester XII (which contained terephthalic acid, isophthalic acid, and ethylene glycol at the molar ration of 80:20:100; T was 62° C.) was placed. The first barrel was heated to 280° C., the second barrel was heated to 270° C., and the third barrel was heated to 270° C., and the melted resins were extruded. That is, the molten resins from the three extruders were brought together at the die and extruded, giving a three-layered laminated film. This laminated film was cooled and hardened by being wrapped on a rotating roller for cooling (at 20° C). The laminated film obtained had a polyethyleneterephthalate film layer, a first heat-sealing film layer, and a second heat-sealing film layer, which were disposed in this order. The thicknesses of the layers were 184 μm for the polyethyleneterephthalate layer, 25 μm for the first heat-sealing layer, and 6 μm for the second heat-sealing layer. This film was stretched 3.6-fold in the direction of movement through two pairs of nipping rollers heated at 90° C. and moving at different speeds. The film obtained that was stretched in one direction was supplied to a tenter device for stretching in the direction of the width of the sheet, and the film was stretched 3.4-fold in the direction at right angles to the direction of the above stretching, at 100° C. The film was then released slightly from being stretched and was treated with a hot blast of air at 220° C. before being rolled. The sealing energy of the laminated film obtained was 900 g.cm/15 mm, and the film had very good antiblocking properties.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A polyester laminated film comprising a base film of a polyester resin and a sealing film of a polyester composition, said sealing film being disposed on at least one side of said base film, wherein the sealing energy, which is measured when two pieces of said laminated films are joined together with the respective sealing films facing each other, is 400 g.cm/15 mm or more, wherein said sealing film is a heat-sealing film and wherein the starting temperature of thermal molecular motion in said polyester composition is in the range of 30° to 65° C., wherein said polyester composition comprises:

a polyester resin A containing at least one diol component of the formula:

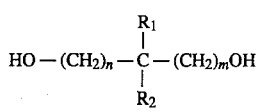

(I)

wherein $R_1$ and $R_2$ are, independently, hydrogen or alkyl containing 1 to 6 carbon atoms, with the proviso that at least one of $R_1$ and $R_2$ is alkyl containing 1 to 6 carbon atoms, and wherein n and m are, independently, integers of 1 to 6; and a polyester resin B containing at least one dicarboxylic acid component of the formula:

$$HOOC-(CH_2)_p COOH \quad \text{(IIa)}$$

wherein p is an integer of 4 to 20; and at least one glycol component of the formula:

$$HO-(CH_2)_q-OH \quad \text{(IIb)}$$

wherein q is an integer of 4 to 10.

2. A polyester laminated film according to claim 1, wherein said starting temperature is in the range of 45° to 60° C.

3. A polyester laminated film according to claim 1, wherein said polyester composition comprises a polyester resin having a starting temperature of thermal molecular motion higher than 50° C. and a polyester resin having a starting temperature of thermal molecular motion lower than or equal to 50° C.

4. A polyester laminated film according to claim 1, wherein the ratio of stress under 10% stretch to stress under 50% stretch of at least one of said base films and said sealing film is 1.2 or less.

5. A polyester laminated film according to claim 1, wherein said polyester composition comprises a polyester resin containing at least two dicarboxylic acid components as constituent monomers.

6. A polyester laminated film according to claim 1, wherein said polyester composition comprises a polyester resin containing at least two diol components as constituent monomers.

7. A polyester laminated film according to claim 1, wherein said polyester composition comprises a polyester resin containing at least two dicarboxylic acid components as constituent monomers and a polyester resin containing at least two diol components as constituent monomers.

8. A polyester laminated film according to claim 1, wherein said polyester composition further comprises a polyester resin containing at least one lactone component as a constituent monomer.

9. A polyester laminated film according to claim 1, wherein said polyester composition further comprises a lubricating agent.

10. A polyester laminated film according to claim 1, wherein said heat-sealing film is a layered structure composed of at least two kinds of polyester compositions.

11. A polyester laminated film according to claim 1, wherein said base film is composed of a homopolyester or a copolyester.

12. A polyester laminated film according to claim 1, wherein said base film is composed of at least two kinds of resins selected from the group consisting of homopolyesters and copolyesters.

13. A polyester laminated film according to claim 1, wherein said sealing film is disposed on one side of said base film and a deposited layer of metal or metal oxide or an adhesive layer is disposed on the other side of said base film.

14. A polyester laminated film according to claim 1, wherein said polyester composition further comprises at least one of inorganic particles and organic particles.

15. A polyester laminated film according to claim 14, wherein said particles have a mean diameter smaller than the thickness of said heat-sealing layer, said particles are present in an amount of 0.01% to 5% by weight based on the total weight of said polyester composition.

16. A polyester laminated film according to claim 14, wherein the variation in the diameter of said particles observed by scanning electron microscopy is 25% or less, and the ratio of the mean projected cross-sectional area of said particles to the mean area of a circumscribed circle of said particles observed by scanning electron microscopy is 60% or more.

* * * * *